United States Patent
Malhotra

(10) Patent No.: US 9,197,458 B1
(45) Date of Patent: Nov. 24, 2015

(54) EDGE EQUALIZATION VIA ADJUSTMENT OF UNROLL THRESHOLD FOR CROSSING SLICER

(71) Applicant: Samsung Display Co., Ltd., Yongin, Gyeonggi-do (KR)

(72) Inventor: Gaurav Malhotra, Cupertino, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/658,077

(22) Filed: Mar. 13, 2015

Related U.S. Application Data

(60) Provisional application No. 61/987,402, filed on May 1, 2014.

(51) Int. Cl.
  *H04L 25/03* (2006.01)
  *H04L 7/00* (2006.01)
  *H04L 27/01* (2006.01)

(52) U.S. Cl.
  CPC ........ *H04L 25/03057* (2013.01); *H04L 7/0029* (2013.01); *H04L 25/03038* (2013.01); *H04L 27/01* (2013.01)

(58) Field of Classification Search
  None
  See application file for complete search history.

(56) References Cited

U.S. PATENT DOCUMENTS

| | | | |
|---|---|---|---|
| 6,295,317 B1 * | 9/2001 | Hartup et al. | 375/235 |
| 7,653,127 B2 | 1/2010 | Brunn et al. | |
| 8,027,409 B2 | 9/2011 | Aziz et al. | |
| 8,923,380 B1 * | 12/2014 | Malhotra | 375/232 |
| 2005/0185742 A1 * | 8/2005 | Liu | 375/348 |

* cited by examiner

*Primary Examiner* — Leon-Viet Nguyen
(74) *Attorney, Agent, or Firm* — Christie, Parker & Hale, LLP

(57) ABSTRACT

A system and method for decision feedback equalization of a crossing slicer. A serial receiver includes a data slicer and a crossing slicer, and implements decision feedback equalization for the data slicer, with a plurality of data weights. The serial receiver also implements decision feedback equalization for the crossing slicer, using crossing weights that are interpolated between corresponding pairs of the data weights. The crossing weights may be formed by any suitable interpolation method, including linear interpolation, cubic interpolation, or spline interpolation.

20 Claims, 10 Drawing Sheets

EDGE EQUALIZATION VIA ADJUSTMENT OF UNROLL THRESHOLD FOR CROSSING SLICER

CROSS-REFERENCE TO RELATED APPLICATION(S)

The present application claims priority to and the benefit of U.S. Provisional Application No. 61/987,402, filed May 1, 2014, entitled "IMPROVED EDGE EQUALIZATION VIA ADJUSTMENT OF UNROLL THRESHOLD FOR CROSSING SLICER", the entire content of which is incorporated herein by reference.

FIELD

The following description relates to transmission of digital data over a non-ideal (e.g., lossy) channel, and more particularly to a predictive decision feedback equalizer for mitigating inter-symbol interference in a crossing slicer, the inter-symbol interference resulting from transmission through a non-ideal channel.

BACKGROUND

High-speed digital data links may suffer from inter-symbol interference, especially in situations in which loss, reflections or other imperfections exist in the transmission channel. Inter-symbol interference may have the effect that the signal received during a given clock cycle includes a linear combination of (i) the bit transmitted during the corresponding clock cycle at the transmitter, and (ii) the bits transmitted during a number of preceding clock cycles. The effects of inter-symbol interference may be mitigated using a technique referred to as decision feedback equalization (DFE) which involves correcting the received signal at the sampling point, during each clock cycle, with a linear combination of the bits received during a number of preceding clock cycles.

A serial receiver may include two slicers, e.g., a data slicer and a crossing slicer. The serial signal received by the data slicer may be corrected by a sum of taps calculated from the previously received bits and a model of the channel characteristics. The correction from the most recently received bit (or "last bit"), which is referred to as the first data tap, may be generated using a technique referred to as predictive decision feedback equalization (predictive DFE, which may also be referred to as speculative DFE or loop-unrolled DFE), in which two correction terms are calculated, one corresponding to a received 1 in the last bit, and one corresponding to a received 0 in the last bit; the appropriate one of these two correction terms is then selected using a multiplexer (MUX) once a binary value for the last bit is available. A similar correction of the serial signal received by the crossing slicer may be performed, but the taps for the data slicer may not provide an accurate estimate of the required correction for the crossing slicer, which samples at different points in time than the data slicer. Thus, there is a need for a system providing improved mitigation of inter-symbol interference in a crossing slicer.

SUMMARY

Aspects of embodiments of the present disclosure are directed toward a system and method for decision feedback equalization of a crossing slicer. A serial receiver includes a data slicer and a crossing slicer, and implements decision feedback equalization for the data slicer, with a plurality of data weights. The serial receiver also implements decision feedback equalization for the crossing slicer, using crossing weights that are interpolated between corresponding pairs of the data weights. The crossing weights may be formed by any suitable interpolation method, including linear interpolation, cubic interpolation, or spline interpolation.

According to an embodiment of the present invention there is provided a method for operating a digital link, the method including: processing an input signal by a data slicer and a data decision feedback equalizer (DFE), the data DFE including a plurality of data weights; and processing the input signal by a crossing slicer and a crossing DFE, the crossing DFE including a plurality of crossing weights, a crossing weight of the plurality of crossing weights being equal to a value interpolated between a first data weight of the plurality of data weights and a second data weight of the plurality of data weights of data weights.

In one embodiment, the value is interpolated between the first data weight and the second data weight.

In one embodiment, the value is interpolated between the first data weight and the second data weight by polynomial interpolation of order greater than 1.

In one embodiment, the value is interpolated between the first data weight and the second data weight by cubic interpolation.

In one embodiment, the value is interpolated between the first data weight and the second data weight by spline interpolation.

In one embodiment, the method includes controlling a phase of a local clock with the output of the crossing slicer.

In one embodiment, the method includes controlling a frequency of a local clock with the output of the crossing slicer.

In one embodiment, the processing of the input signal by the data slicer and the data DFE includes forming a plurality of data taps from a plurality of previously received bit values and the plurality of data weights, and the processing of the input signal by the crossing slicer and the crossing DFE includes forming a plurality of crossing taps from the plurality of previously received bit values and the plurality of crossing weights.

In one embodiment, the processing of the input signal by the data slicer and the data DFE further includes setting an offset of the data slicer to a value of a data tap, and the processing of the input signal by the crossing slicer and the crossing DFE further includes setting an offset of the crossing slicer to a value of a crossing tap.

According to an embodiment of the present invention there is provided a system for receiving serial data, the system including: a data slicer; a data decision feedback equalizer (DFE) with a plurality of data weights; a crossing slicer; and a crossing DFE with a plurality of crossing weights, a crossing weight of the plurality of crossing weights being equal to a value interpolated between a first data weight of the plurality of data weights and a second data weight of the plurality of data weights of data weights.

In one embodiment, the value is equal to a value interpolated by linear interpolation based on the first data weight and the second data weight.

In one embodiment, the value is equal to a value interpolated by linear interpolation based on the first data weight, the second data weight, and a third data weight.

In one embodiment, the value is equal to a value interpolated by polynomial interpolation of order greater than 1.

In one embodiment, the value is equal to a value interpolated by cubic interpolation.

In one embodiment, the value is equal to a value interpolated by spline interpolation.

In one embodiment, each slicer of the data slicer and the crossing slicer includes a differential pair having a differential output and including a first transistor and a second transistor, wherein the differential output of the differential pair is connected to the differential output of the data slicer.

In one embodiment, each slicer of the data slicer and the crossing slicer further includes a comparator with positive feedback including a third transistor and a fourth transistor and having a differential output, the differential output being connected to the differential, output of the differential pair.

In one embodiment, a fifth transistor is connected to a source of the first transistor and to a source of the second transistor, to control a total source current of the first transistor and the second transistor.

In one embodiment, a sixth transistor is connected to a source of the third transistor and to a source of the fourth transistor, to control a total source current of the third transistor and the fourth transistor.

In one embodiment, each of: the first transistor, the second transistor, the third transistor, the fourth transistor, the fifth transistor, and the sixth transistor, is an n-channel metal-oxide field effect transistor.

BRIEF DESCRIPTION OF THE DRAWINGS

These and other features and advantages of the present invention will be appreciated and understood with reference to the specification, claims and appended drawings wherein:

DETAILED DESCRIPTION

The detailed description set forth below in connection with the appended drawings is intended as a description of exemplary embodiments of a system and method for improved edge equalization via adjustment of unroll threshold for crossing slicer provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1A:
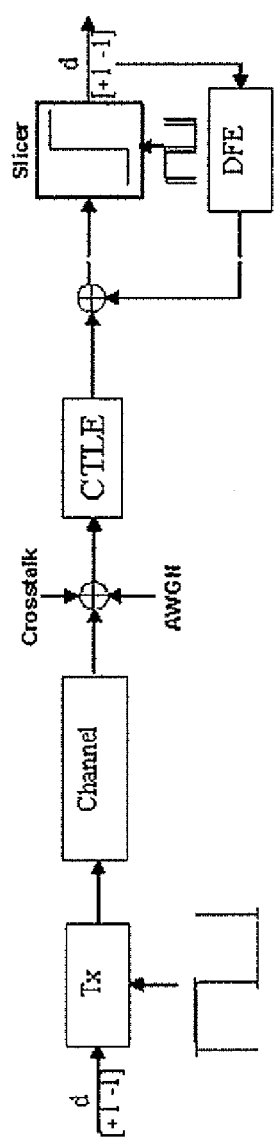
FIG. 1A is a block diagram of a serial transmitter, a lossy channel, and a receiver according to an embodiment of the present invention.
Figure 1B:
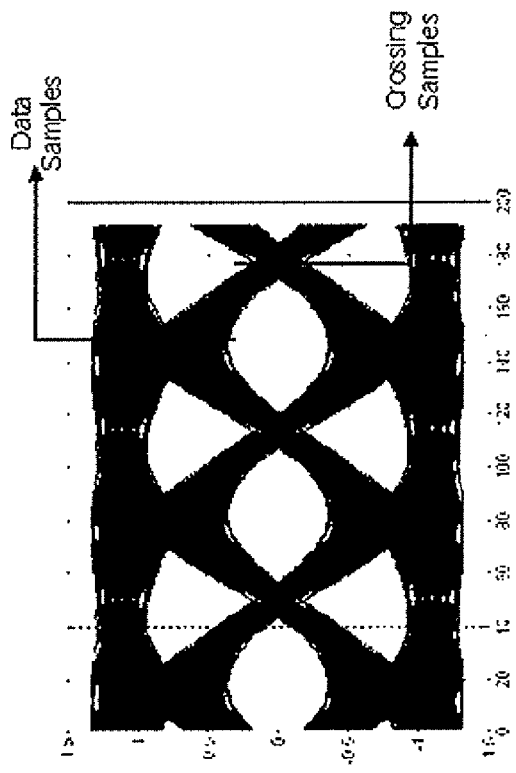
FIG. 1B is an eye diagram of a serial signal after correction by decision feedback equalization according to an embodiment of the present invention.

Referring to FIG. 1A, in one embodiment a signal transmitted by a serial transmitter TX propagates through a channel, in which it is subjected to crosstalk, additive white Gaussian noise, and channel "loss" e.g., channel dispersion and/or frequency-dependent attenuation. At the serial receiver end of the channel, a continuous time linear equalizer (CTLE) compensates for some of the channel loss. The output of the channel, or of the CTLE if one is present, is referred to herein as the serial signal; it is the input to the serial receiver. The serial signal may be considered to be an analog signal, which is analyzed by the serial receiver to determine the sequence of bits that was transmitted by the serial transmitter. In the serial receiver, corrections to compensate for channel loss may be applied by a decision feedback equalizer (DFE), and a data slicer may be used in concert with the DFE to determine whether each received bit is a binary zero or one. Also in the serial receiver, a crossing slicer may be used to determine whether the local sampling clock phase is advanced or retarded relative to transitions in the received data. Referring to FIG. 1B, the eye diagram of a received serial signal may be improved at both the data sampling times and the crossing sampling times by the DFE.

Figure 1C:
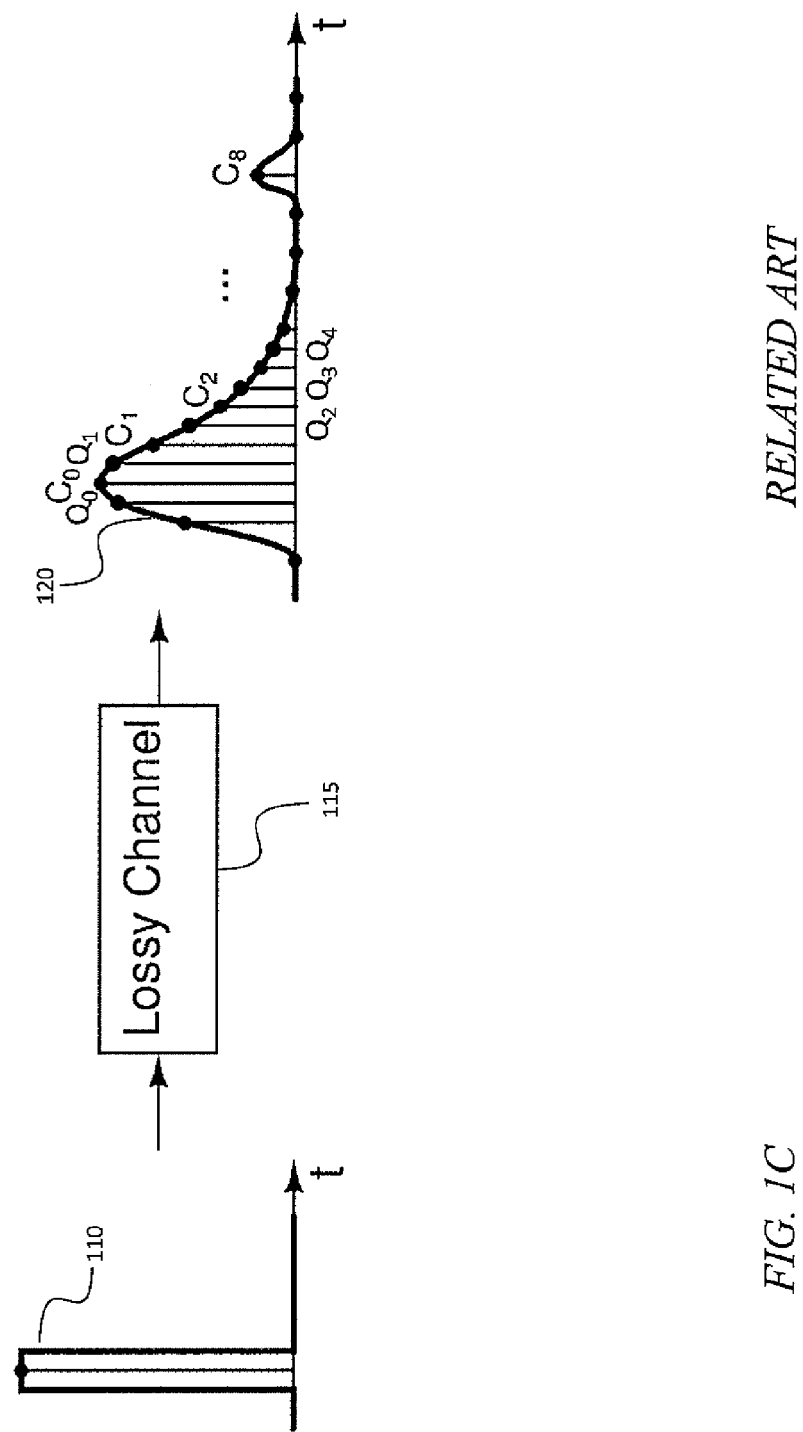
FIG. 1C is an illustration of an input signal to a non-ideal (e.g., lossy) channel and an output signal from the non-ideal channel, exhibiting the effects of inter-symbol interference.

Referring to FIG. 1C, in one embodiment a signal transmitted by the serial transmitter TX is a single square pulse 110, which, after being transmitted through a non-ideal (e.g., lossy) channel 115 becomes a received (analog) serial signal 120, having a different shape from the transmitted signal. This shape may be referred to as the pulse response h(t) of the channel. The received signal 120 has a value $C_0$ when the analog signal is sampled in the receiver, and, because of the imperfect characteristics of the non-ideal channel, the effect of the transmitted pulse 110 persists for several unit intervals (UIs), taking residual signal values referred to as residues or "weights" $C_1$, $C_2$, and so on. The residual signal from previously received pulses may causes inter-symbol interference when a new pulse is received, because the residual signal is received at the same time as, and superimposed on, the new pulse. At the sampling time of any given pulse, the residue from a previously received pulse may be positive or negative (e.g., the residue from the pulse received 3 UIs previously may be $+C_3$ or $-C_3$), depending on whether the previously received bit was a binary 0 or a binary 1. As used herein, a "weight" (e.g., $C_1$, $C_2$, $C_3$, etc.) is a residue from a pulse corresponding to a binary 1, and a "tap" is the residue from a previously received pulse; the tap equals the weight if the previously received bit is a binary 1, and the tap may equal the opposite of the weight (e.g., $-C_1$, $-C_2$, $-C_3$, etc.) if the previously received bit is a binary 0.

Residues from previously received bits may similarly introduce an error at transitions or "edges" in the received serial signal, which may be used to regulate the phase or frequency of a local clock. Thus, the residues at the edges may cause phase or frequency errors in the local clock. The residues at the edges are offset in time by ½ UI from the residues in the data, and are labeled $Q_0$, $Q_1$, $Q_2$, $Q_3$ and $Q_4$ in FIG. 1C.

Figure 1D:
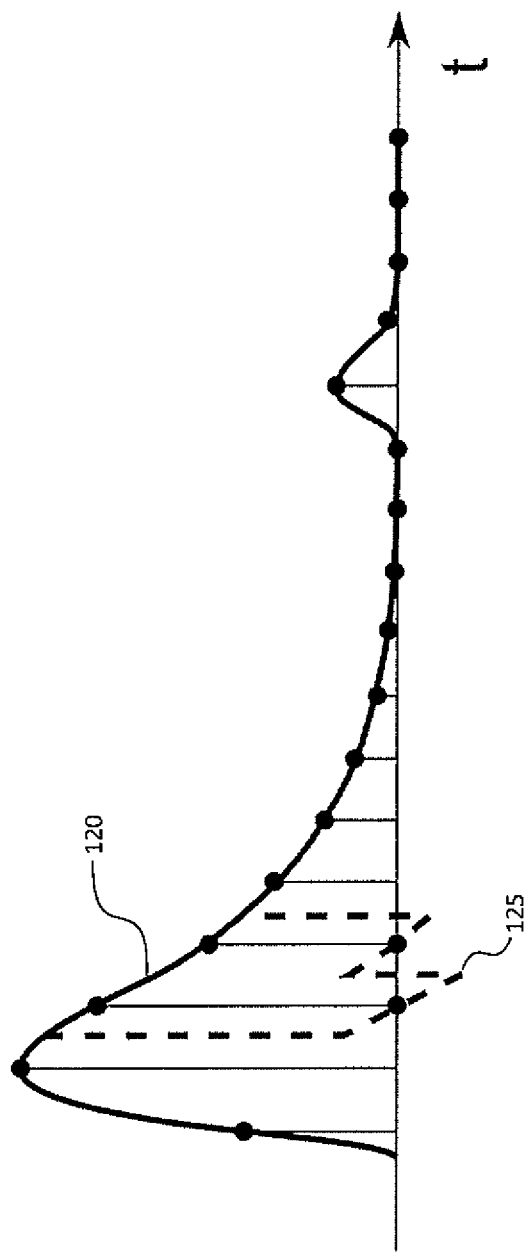
FIG. 1D is a graph showing a signal exhibiting the effects of inter-symbol interference, and a signal in which the effects of inter-symbol interference have been mitigated in the data slicer by feedback equalization.

Referring to FIG. 1D, decision feedback equalization may be used to correct inter-symbol interference at the data slicer, by calculating the error expected in the current bit due to each preceding bit, and adding a corresponding correction to the received serial signal, or, equivalently, adding the corresponding correction to the threshold of the data slicer. The correction is calculated as a sum of taps, each tap being equal to a weight (e.g., $C_1$, $C_2$, etc.) multiplied by +1 or −1 depending on whether the corresponding previously received bit was a 0 or a 1. The weights may be determined prior to operation of the serial link, from a model or measurements of the channel characteristics, or they may be determined, or refined, during operation, by circuitry (or "adaptation hardware") included in the system for this purpose.

Figure 2:
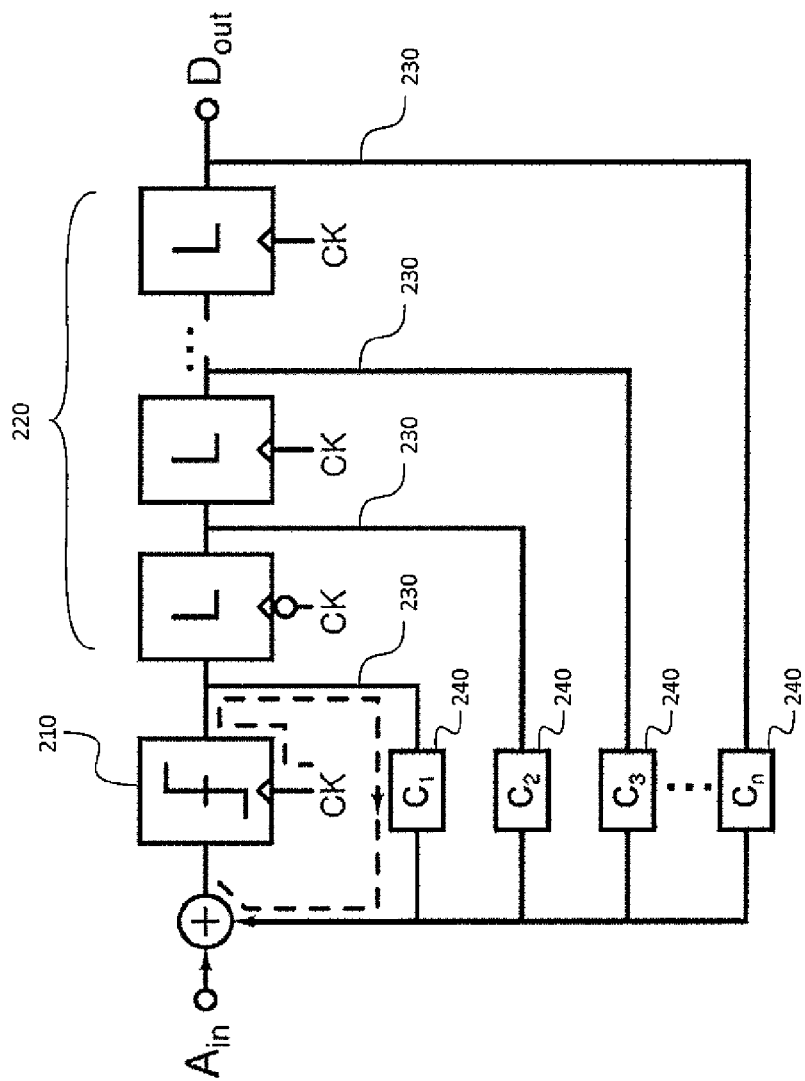
FIG. 2 is a schematic diagram of a system for direct decision feedback equalization.

Referring to FIG. 2, in a related art embodiment, direct DFE for a data slicer 210 is accomplished by processing the received signal with the data slicer 210, which is followed by a storage circuit 220 for storing the previously received bit values. The storage circuit 220 has a plurality of previous bit outputs 230, each supplying the value of a previously received bit. In one embodiment, the storage circuit 220 is a shift register. The data slicer has an analog input connected to the serial signal, and on a rising or falling clock edge, the output of the slicer is set to logical high or logical low according to whether the analog signal, at the time of the clock edge, is above or below the threshold of the slicer. Each of the outputs of the storage circuit is connected to a respective tap generator 240. In one embodiment, each tap generator receives a digital input and generates a tap equal to the corresponding weight if the digital input represents a binary 1, and equal to the opposite of the corresponding weight if the input is a binary 0. Each tap generator may contain a digital to analog converter (DAC) programmed with the weight corresponding to the tap, and a polarity selection circuit that determines whether the weight is added to, or subtracted from, the serial signal, depending on the value of the corresponding previously received bit signal 230.

The path from the first tap is referred to as the critical path because timing along this path presents the greatest challenge in the operation of a direct DFE circuit: in this path the previous bit is resolved and multiplied by its tap value ($C_1$) and subtracted from the current input in one unit interval (UI). As used herein, a unit interval is an interval of time equal to 1 divided by the aggregate data rate. For an aggregate data rate of 6 Gbps, for example, a unit interval is 1/(6e9) seconds.

Figure 3:
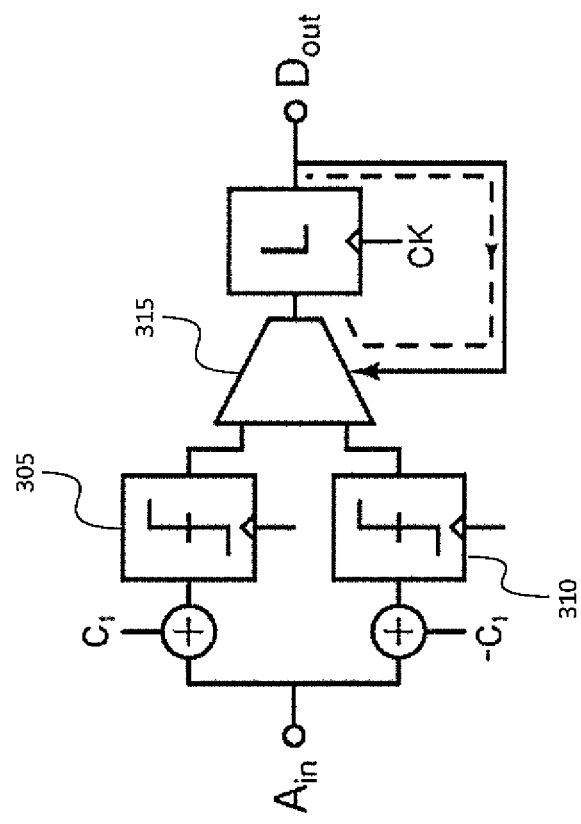
FIG. 3 is a schematic diagram of a system for predictive decision feedback equalization according to an embodiment of the present invention.
Figure 5:
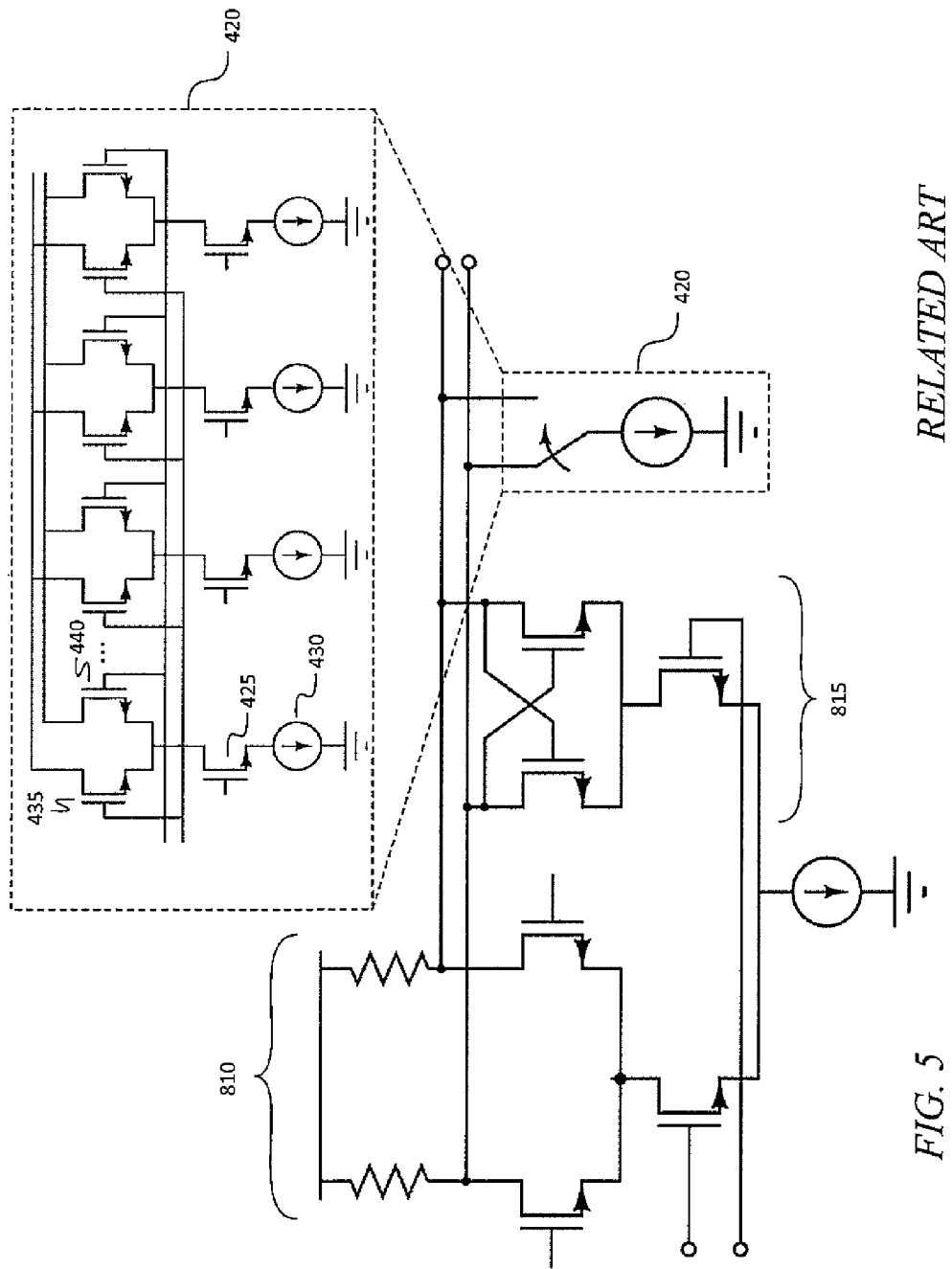
FIG. 5 is a schematic diagram of a slicer with a digital to analog converter according to an embodiment of the present invention.

Referring to FIG. 3, in a predictive DFE (or "loop-unrolling" circuit) according to one related art embodiment, the two possible outcomes, corresponding respectively to last bit values of zero or a one, are pre-calculated by adding an offset $C_1$ or $-C_1$ to the slicer input of each of two respective slicers 305, 310 in two respective branches of the circuit, and converting each result to a digital value in each of the two slicers 305, 310. The correct outcome is selected, in a multiplexer 315, when a decision is made in the receiver regarding whether the last bit was a zero or a one. A predictive DFE may have one or more predictive taps. Although the schematic diagram shows the offsets $C_1$ or $-C_1$ being added to the inputs of the respective slicers, in another embodiment these offsets are instead added to the thresholds of the respective slicers (e.g., as illustrated in FIG. 5).

Figure 4:
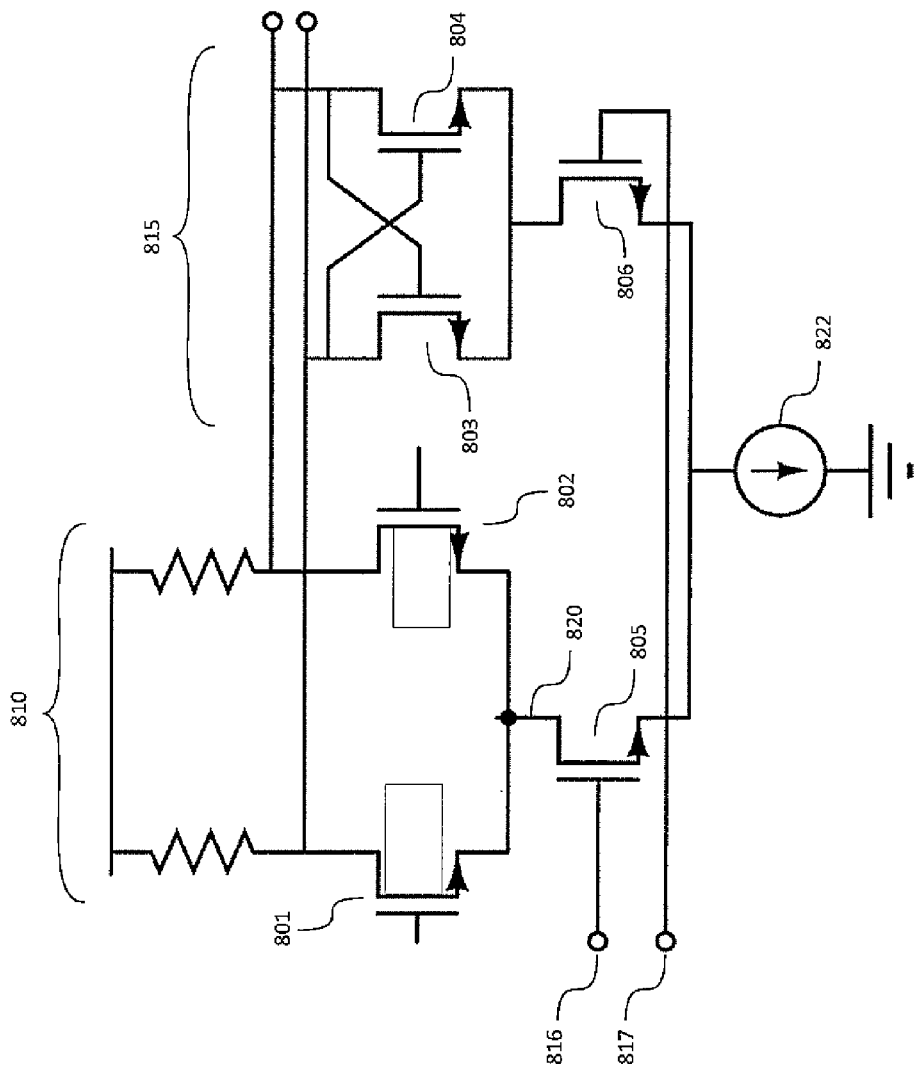
FIG. 4 is a schematic diagram of a slicer according to an embodiment of the present invention.

A slicer (either a data slicer or a crossing slicer) may be constructed as illustrated in FIG. 4 from six n-channel metal-oxide field effect transistors (n-channel MOSFETs or NMOS transistors) transistors in a circuit including first and second NMOS transistors 801, 802 forming a differential pair 810, and third and fourth NMOS transistors 803, 804 forming a comparator with positive feedback (or "regenerative comparator") 815. As used herein, a differential pair is a circuit with two transistors, and two output resistors, the output resistors being connected to a first power supply line and to respective first electrodes of the two transistors, the second electrodes of the two transistors being connected together at a common node, and (indirectly) connected or directly connected to a current source connected to a second power supply line. The control electrodes of the two transistors are the inputs of the differential pair (or, equivalently, form the differential input of the differential pair), and the first electrodes of the transistors are the outputs (or, equivalently, the first electrodes together form the differential output) of the differential pair.

The sources of the NMOS transistors of the differential pair are connected together at a common node 820, and the total source current of the differential pair is controlled by a fifth NMOS transistor 805, the gate of which is connected to the clock input of the slicer. In one embodiment a comparator with positive feedback acts as a latch in the slicer. This comparator is formed as a pair of transistors, e.g., a third NMOS transistor 803 and a fourth NMOS transistor 804, the differential output of which is connected to the differential outputs of the differential pair and to the differential output of the slicer, and the inputs of which are cross-connected to the outputs, providing positive feedback. The sources of the third and fourth NMOS transistors 803, 804 are connected together, and the total source current of the comparator is controlled by a sixth NMOS transistor 806, connected in series between the sources of the third and fourth NMOS transistors 803, 804 and the current source 822.

The gate of the sixth NMOS transistor 806 is connected to the complementary clock input 817 of the slicer. Thus, when the clock input is high, the differential pair 810 is enabled and the output of the slicer tracks the input; when the clock input is low (and the complementary clock input is high), the regenerative comparator 815 is enabled and the output of the slicer retains its previous value. In other embodiments the slicer may be constructed with transistors other than NMOS transistors; PMOS transistors or bipolar junction transistors may be used, for example.

Referring to FIG. 5, the pre-calculation may be accomplished using a circuit including a differential pair 810, a comparator with positive feedback 815, and a current DAC 420, each constructed from field-effect transistors (FETs), e.g., NMOS transistors. The differential amplifier and the comparator with positive feedback 815 are clocked by complementary phases of the clock, to form the slicer, and the current DAC adds an offset current to the output of the differential amplifier. The slicer may be a data slicer or a crossing slicer.

The DAC may include a plurality of DAC branches, each including a current source 430, a weight-selecting transistor 425, and a pair of polarity-selecting transistors 435, 440. The current sources in the different branches may have different sizes, so that turning on various combinations of the weight-selecting transistors results in the DAC sinking various amounts of current. The polarity-selecting transistors 435, 440 in each branch may be arranged in a pair, connected between the weight-selecting transistor and the output and complementary output of the DAC, so that turning on one or the other of the polarity-selecting transistors 435, 440 results in the DAC sinking the current for the branch from either the output or the complementary output of the DAC. The differential output of the DAC may then be connected to the differential output of the slicer (as illustrated in FIG. 5, i.e., the output of the DAC may be connected to the output of the slicer, and the complementary output of the DAC may be connected to the complementary output of the slicer), to add a selectable weight to the threshold of the slicer. Although the slicers and DAC are described and illustrated herein as being constructed with NMOS transistors, in other embodiments these circuits may be constructed with transistors other than NMOS transistors; PMOS transistors or bipolar junction transistors may be used. As used herein, a decision feedback equalizer (DFE) is any circuit that adjusts a received serial signal, or a slicer sampling the received serial signal, or both, with a linear combination (i.e., a weighted sum) of previously received bit values; decision feedback equalization (also DFE) is the process of operating a decision feedback equalizer.

The effects of a lossy channel may be corrected in a crossing slicer in a similar manner, e.g., using direct DFE, or a combination of direct DFE and predictive DFE or loop-unrolling. In the case of predictive DFE, the DFE may adjust the "unroll threshold" of a pair of crossing slicers, i.e., it may adjust the thresholds of two crossing slicers used for predictive DFE. In one related art embodiment, taps used for the data slicer are also used for the crossing slicer. This approach may provide some mitigation of the signal errors introduced by the lossy channel, but because the sampling times of the crossing slicer are offset from those of the data slicer this approach may leave a significant portion of the signal error uncorrected.

Figure 6:
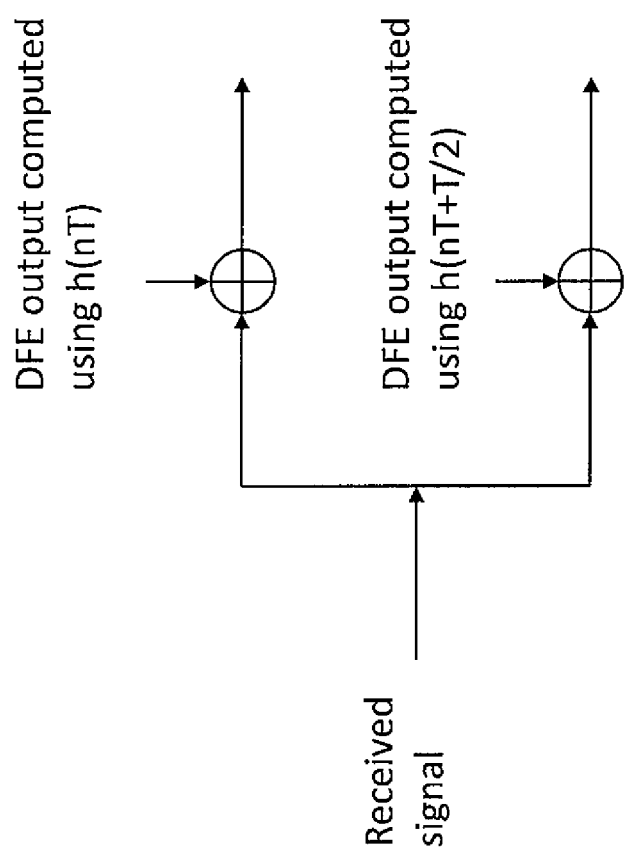
FIG. 6 is a schematic diagram of a system for decision feedback equalization of a data slicer and a crossing slicer according to an embodiment of the present invention.
Figure 7:
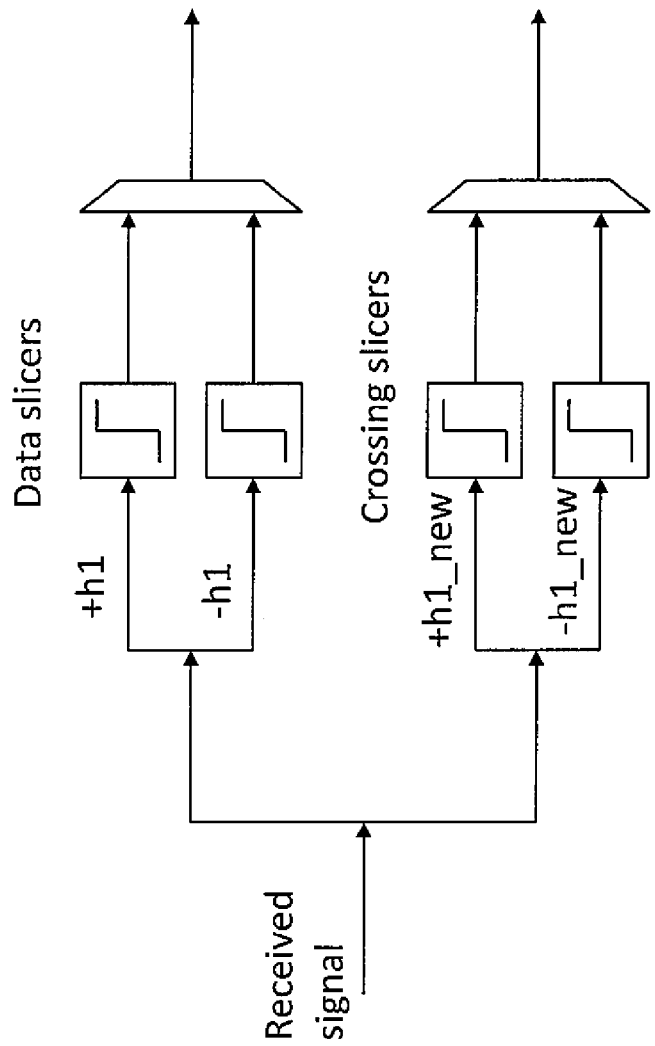
FIG. 7 is a schematic diagram of a system for predictive decision feedback equalization of a data slicer and a crossing slicer according to an embodiment of the present invention.
Figure 8:
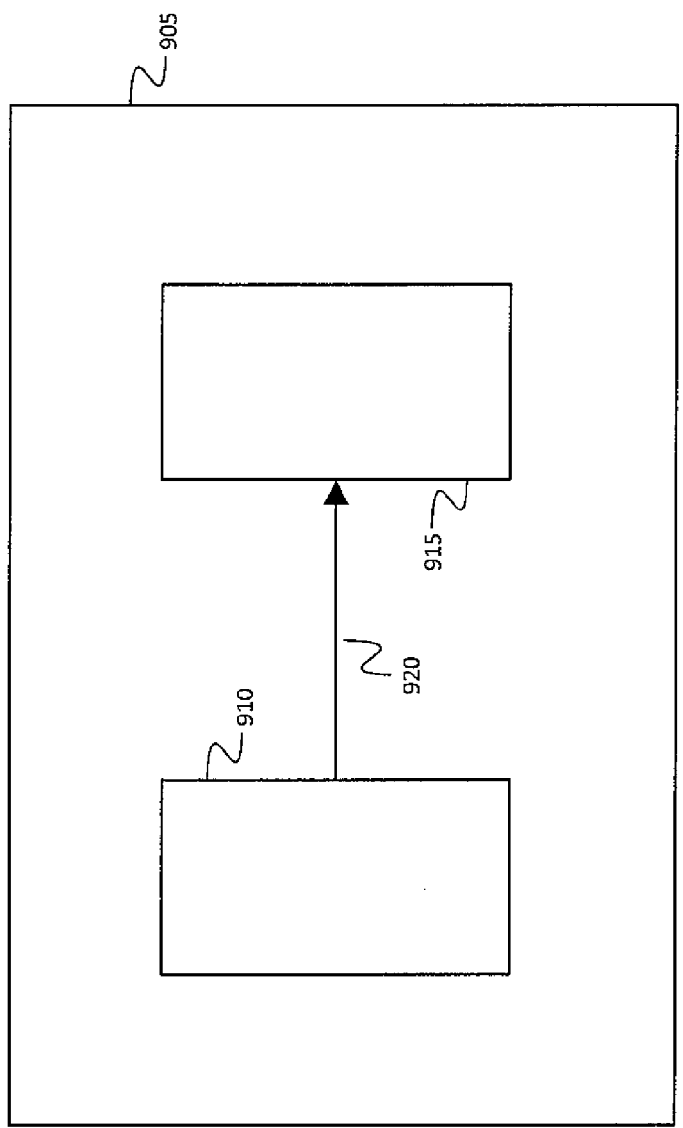
FIG. 8 is a block diagram of a display according to an embodiment of the present invention.

In one embodiment of the present invention illustrated in FIG. 6, a separate set of taps is used to perform DFE for the crossing slicer. These taps use a set of crossing weights ($Q_0$, $Q_1$, $Q_2$, $Q_3$ etc., or, equivalently h(nT+T/2), where T is a UI) that correspond to the crossing sampling times (i.e., sampling times offset by ½ UI from the data sampling times). The crossing weights may be different from the data weights (where the data weights are $C_1$, $C_2$, $C_3$, etc., or equivalently h(nT)). This approach is equally applicable to a receiver in which predictive DFE is used for both data (in a pair of data slicers) and crossings (in a pair of crossing slicers), as shown in FIG. 7, with h1 being the first tap data weight, and h1_new being the first tap crossing weight.

In one embodiment, crossing weights (corresponding to sampling times offset by ½ UT from the data sampling times) may be formed from the data weights by interpolation. For example, linear interpolation may be used, to form each crossing weight from the immediately preceding and immediately following data weights, i.e., $Q_1=(C_0+C_1)/2$, $Q_2=(C_1+C_2)/2$ etc. In other embodiments, spline interpolation, polynomial interpolation of order greater than 1 (e.g., cubic interpolation), or linear interpolation using more than the immediately preceding, and immediately following, data weights may be used to find each crossing weight. As used herein, a "value interpolated between two data weights" is a value formed for a sampling time half-way between the sampling times corresponding to the two data weights, by an interpolation function that takes as input one or more of the data weights. The interpolation function may take as input the two data weights between which the interpolation is being performed, or it may take as input additional data weights, for example if the function implements spline interpolation or linear interpolation using more than two data weights.

In another embodiment, instead of employing separate data and crossing slicers, a single slicer is used, operating at twice the data rate. Its samples are then alternately data and crossing slicers, and a single DFE circuit, with weights that are alternately data weights and crossing weights, is used.

In one embodiment the output of the crossing slicer is used in a feedback loop to correct the phase or frequency of a local clock, e.g., the local sampling clock, which may be recovered in a clock recovery circuit including, e.g., a delay-locked loop or a phase-locked loop. For example, if on average the crossing slicer output is logical high for transitions when the data value is transitioning from logical low to logical high, then the cause may be that sampling clock phase is retarded relative to the transitions in the data, and the feedback loop may advance the phase of the sampling clock, or increase its frequency, accordingly.

Referring to FIG. 9, in one embodiment, a display 905 contains a timing controller 910 configured to send high-speed digital data to a driver integrated circuit (driver IC) 915, over a non-ideal (e.g., lossy) channel 920. The driver IC receives a signal that is affected by inter-symbol interference. The driver IC includes a serial receiver including a predictive DFE constructed according to an embodiment of the present invention to mitigate the effects of the inter-symbol interference in a crossing slicer, or in two crossing slicers in the serial receiver. Here, in embodiments of the present invention, the display is an organic light emitting diode (OLED) display or a liquid crystal display (LCD).

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration.

As used herein, the teens "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although exemplary embodiments of a system and method for improved edge equalization via adjustment of unroll threshold for crossing slicer have been specifically described and illustrated herein, many modifications and variations will be apparent to those skilled in the art. Accordingly, it is to be understood that a system and method for improved edge equalization via adjustment of unroll threshold for crossing slicer constructed according to principles of this invention may be embodied other than as specifically described herein. The invention is also defined in the following claims, and equivalents thereof.

What is claimed is:

1. A method for operating a digital link, the method comprising:
   processing an input signal by a data slicer and a data decision feedback equalizer (DFE), the data DFE comprising a plurality of data weights; and
   processing the input signal by a crossing slicer and a crossing DFE, the crossing DFE comprising a plurality of crossing weights,
   a crossing weight of the plurality of crossing weights being equal to a value interpolated between a first data weight of the plurality of data weights and a second data weight of the plurality of data weights of data weights.

2. The method of claim 1, wherein the value is interpolated between the first data weight and the second data weight.

3. The method of claim 1, wherein the value is interpolated between the first data weight and the second data weight by polynomial interpolation of order greater than 1.

4. The method of claim 3, wherein the value is interpolated between the first data weight and the second data weight by cubic interpolation.

5. The method of claim 1, wherein the value is interpolated between the first data weight and the second data weight by spline interpolation.

6. The method of claim 1, further comprising controlling a phase of a local clock with an output of the crossing slicer.

7. The method of claim 1, further comprising controlling a frequency of a local clock with an output of the crossing slicer.

8. The method of claim 1, wherein:
   the processing of the input signal by the data slicer and the data DFE comprises forming a plurality of data taps from a plurality of previously received bit values and the plurality of data weights, and
   the processing of the input signal by the crossing slicer and the crossing DFE comprises forming a plurality of crossing taps from the plurality of previously received bit values and the plurality of crossing weights.

9. The method of claim 1, wherein:
   the processing of the input signal by the data slicer and the data DFE further comprises setting an offset of the data slicer to a value of a data tap, and
   the processing of the input signal by the crossing slicer and the crossing DFE further comprises setting an offset of the crossing slicer to a value of a crossing tap.

10. A system for receiving serial data, the system comprising:
    a data slicer;
    a data decision feedback equalizer (DFE) with a plurality of data weights;
    a crossing slicer; and
    a crossing DFE with a plurality of crossing weights,
    a crossing weight of the plurality of crossing weights being equal to a value interpolated between a first data weight of the plurality of data weights and a second data weight of the plurality of data weights of data weights.

11. The system of claim 10, wherein the value is equal to a value interpolated by linear interpolation based on the first data weight and the second data weight.

12. The system of claim 10, wherein the value is equal to a value interpolated by linear interpolation based on the first data weight, the second data weight, and a third data weight.

13. The system of claim 10, wherein the value is equal to a value interpolated by polynomial interpolation of order greater than 1.

14. The system of claim 13, wherein the value is equal to a value interpolated by cubic interpolation.

15. The system of claim 10, wherein the value is equal to a value interpolated by spline interpolation.

16. The system of claim 10, wherein each slicer comprises a differential pair having a differential output and comprising a first transistor and a second transistor, wherein the differential output of the differential pair of each slicer is connected to the differential output of the respective slicer.

17. The system of claim 16, wherein each slicer further comprises a comparator with positive feedback comprising a third transistor and a fourth transistor and having a differential output, the differential output of the comparator of each slicer being connected to the differential output of the respective slicer.

18. The system of claim 17, wherein a fifth transistor of each slicer is connected to a source of the first transistor of the respective slicer and to a source of the second transistor of the respective slicer, to control a total source current of the first transistor of the respective slicer and the second transistor of the respective slicer.

19. The system of claim 18, wherein a sixth transistor of each slicer is connected to a source of the third transistor of the respective slicer and to a source of the fourth transistor of the respective slicer, to control a total source current of the third transistor of the respective slicer and the fourth transistor of the respective slicer.

20. The system of claim 19, wherein each of:
    the first transistors,
    the second transistors,
    the third transistors,
    the fourth transistors, the fifth transistors, and
the sixth transistors,
is an n-channel metal-oxide field effect transistor.

\* \* \* \* \*